United States Patent
Helmis et al.

(10) Patent No.: US 9,859,760 B2
(45) Date of Patent: Jan. 2, 2018

(54) ELECTRIC MOTOR HAVING AN ASYMMETRIC STATOR

(71) Applicant: Mahle International GmbH, Stuttgart (DE)

(72) Inventors: Martin Helmis, Esslingen (DE); Michael Krappel, Stuttgart (DE)

(73) Assignee: Mahle International GmbH (DE)

( * ) Notice: Subject to any disclaimer, the term of this patent is extended or adjusted under 35 U.S.C. 154(b) by 581 days.

(21) Appl. No.: 14/390,386

(22) PCT Filed: Apr. 3, 2013

(86) PCT No.: PCT/EP2013/056980
§ 371 (c)(1),
(2) Date: Oct. 2, 2014

(87) PCT Pub. No.: WO2013/150048
PCT Pub. Date: Oct. 10, 2013

(65) Prior Publication Data
US 2015/0054379 A1 Feb. 26, 2015

(30) Foreign Application Priority Data
Apr. 3, 2012 (DE) ........................ 10 2012 205 421

(51) Int. Cl.
*H02K 1/06* (2006.01)
*H02K 21/26* (2006.01)
(Continued)

(52) U.S. Cl.
CPC ............. *H02K 1/14* (2013.01); *H02K 21/222* (2013.01); *H02K 29/03* (2013.01); *H02K 2201/03* (2013.01)

(58) Field of Classification Search
CPC ........... H02K 1/14; H02K 21/22; H02K 29/03
(Continued)

(56) References Cited

U.S. PATENT DOCUMENTS 4,357,563 A * 11/1982 Ohno .................... H02K 29/08
310/156.26
4,554,491 A 11/1985 Plunkett
(Continued)

FOREIGN PATENT DOCUMENTS

DE 102004055923 A1 2/2006
DE 102006004313 A1 8/2007
(Continued)

OTHER PUBLICATIONS

English abstract for DE-102006004313.
English abstract for JP61-73531.

*Primary Examiner* — Jose Gonzalez Quinones
(74) *Attorney, Agent, or Firm* — Fishman Stewart PLLC (57) ABSTRACT

An electric motor may have a rotor and a stator. An external part and an internal part may be arranged concentrically to a rotation axis and may be adjustable rotationally relative to each other about the rotation axis. The electric motor may be one of an external rotor motor and an internal rotor motor. The external part may have at least two permanent magnets. The internal part may have at least two pole arms and at least one electric coil. The rotor may be formed symmetrically and the stator may be formed asymmetrically.

26 Claims, 4 Drawing Sheets (51) Int. Cl.
*H02K 1/14* (2006.01)
*H02K 21/22* (2006.01)
*H02K 29/03* (2006.01)

(58) Field of Classification Search
USPC .......... 310/49.24, 49.37, 81, 156.38, 156.44,
310/156.45, 216.012, 216.044, 216.091,
310/216.093, 216.096–216.097, 216.103,
310/216.112
See application file for complete search history.

(56) References Cited

U.S. PATENT DOCUMENTS

| | | | |
|---|---|---|---|
| 4,644,233 A * | 2/1987 | Suzuki | H02K 29/08 310/68 R |
| 5,057,731 A | 10/1991 | Hancock | |
| 5,639,322 A * | 6/1997 | Okuda | C04B 37/005 156/274.4 |
| 6,080,352 A * | 6/2000 | Dunfield | H02K 29/03 148/103 |
| 6,181,947 B1 * | 1/2001 | Du | H04W 72/0446 370/336 |
| 7,064,465 B2 | 6/2006 | Huang et al. | |
| 7,102,265 B2 | 9/2006 | Totsu et al. | |
| 7,339,301 B2 | 3/2008 | Chen et al. | |
| 7,342,338 B2 | 3/2008 | Miyazaki et al. | |
| 7,345,440 B2 | 3/2008 | Wang et al. | |
| 2004/0056553 A1 | 3/2004 | Fujinaka | |
| 2005/0179335 A1 | 8/2005 | Fujinaka | |
| 2006/0033400 A1 | 2/2006 | Totsu et al. | |
| 2012/0070324 A1 * | 3/2012 | Haecker | H02K 1/187 417/415 |
| 2012/0104905 A1 | 5/2012 | Prudham et al. | |

FOREIGN PATENT DOCUMENTS

| | | |
|---|---|---|
| FR | 2945388 A1 | 11/2010 |
| JP | 61-073531 | 4/1986 |
| KR | 100878565 B1 * | 1/2009 |
| WO | WO-98/58443 A1 | 12/1998 |

* cited by examiner

ELECTRIC MOTOR HAVING AN ASYMMETRIC STATOR

CROSS-REFERENCE TO RELATED APPLICATIONS

This application claims priority to International Patent Application PCT/EP2013/056980, filed Apr. 3, 2013, and German Patent Application No. 10 2012 205 421.9 filed Apr. 3, 2012, the contents of which are hereby incorporated by reference in their entirety.

TECHNICAL FIELD

The present invention relates to an electric motor according to the preamble of Claim 1. The invention also relates to a hydraulic pump equipped with such an electric motor.

BACKGROUND

DE 10 2006 004 313 A1 discloses an electric motor with a rotor and a stator, which has an external part and an internal part, which are arranged concentrically to a rotation axis and can be adjusted rotationally in relation to each other about the said rotation axis. The known electric motor is designed as an external rotor motor, so that the external part forms an external rotor and the internal part forms an internal stator. The external rotor is assembled from four permanent magnets. The internal stator has four pole arms, which each bear an electric coil. The known electric motor is overall designed to be symmetrical in the circumferential direction.

In order to make it easier for an electric motor to start up, it is known from U.S. Pat. No. 7,345,440 B2 to make an air gap that forms radially between the internal rotor and the external stator in such an electric motor asymmetrical in the circumferential direction. For example, the air gap can taper in a continuous or stepped manner in the circumferential direction. A pole shoe on the stator side can likewise include a longitudinal groove or be designed to be unequal or asymmetrical in the circumferential direction. In the known electric motor, the asymmetries are always realised by an asymmetrical design of the stator, while the rotor is symmetrical.

FR 2 945 388 A1 discloses a further electric motor in which an asymmetry is realised by combining an internal rotor that bears four permanent magnets with an external stator that bears three or six coils.

SUMMARY

The present invention is concerned with the problem of specifying an improved embodiment for an electric motor of the above-mentioned type and for a hydraulic pump equipped therewith, which has improved starting behaviour and/or a simple construction.

This problem is solved according to the invention by the subject matter of the independent claim. Advantageous embodiments form the subject matter of the dependent claims.

The invention is based on the general concept of making only the stator in the electric motor asymmetrical, in particular in the circumferential direction, while the rotor is symmetrical, in particular in the circumferential direction. The asymmetry in the stator produces an improved starting behaviour. At the same time, an asymmetry in the stator can be realised much more easily than in the rotor. Simplified and thus more cost-effective production is thus produced for the electric motor presented here. The respective symmetry or asymmetry in the circumferential direction means a distribution of the electromagnetic forces effective for driving the rotor which is uniform, that is, symmetrical, or non-uniform, that is, asymmetrical, in the circumferential direction. For example, an asymmetrical stator can be point-symmetrical in relation to the rotation axis, while a symmetrical rotor is in particular mirror-symmetrical. An asymmetrical rotor or stator is in particular not mirror-symmetrical. The symmetries and asymmetries described here can therefore also be referred to as electromagnetic symmetry or asymmetry.

The electric motor presented here is preferably a single-phase motor. However, it can in principle also be a two-phase motor. Furthermore, the electric motor presented here is preferably a d.c. motor. Alternatively, it can in principle also be an a.c. motor. The electric motor according to the invention is in particular an electrically commutated motor. In this case the electric motor can be a brushless d.c. (BLDC) motor.

The electric motor presented here is preferably designed as an external rotor motor, so that the external part is formed as an external rotor, while the internal part is formed as an internal stator. Since according to the invention only the stator is asymmetrical, while the rotor is symmetrical, with the external rotor motor no imbalances in the external rotor can arise in the external rotor owing to the asymmetry, even at high rotation speeds. A simplified startup can thus be realised for the external rotor motor. In principle, however, the electric motor presented here can also be designed as an internal rotor motor, so that the internal part forms an internal rotor, while the external part forms an external stator.

The asymmetry of the stator can be used in conjunction with a corresponding control system, which monitors the current flow to the electric motor, to determine the current rotation position between rotor and stator. In this manner, the control system always knows the rotation position between the internal part and the external part and as a result can monitor the current rotation speed and where necessary regulate it.

According to an advantageous embodiment, the asymmetry of the internal part can be selected in a targeted manner in such a manner that, when the electric motor is supplied with current in order to start the same, a magnetic field is produced, which drives the rotor in a predefined rotation direction, starting from a starting relative position that is automatically produced between the internal part and the external part when the electric motor is not supplied with current. In other words, when the rotor is stationary in the predefined starting position, the supply of current to the at least one coil of the internal part results in a torque that drives the rotor in a predefined rotation direction out of the starting position. Startup in particular can thus be made much easier. At the same time, it can also be ensured thereby that the electric motor always starts with the predefined rotation direction as long as a corresponding current is supplied.

According to an advantageous embodiment, at least one such pole arm of the internal part can have a pole shoe on the radial outside, which has an outer side on the radial outside. An air gap can be formed radially between the said outer side of the respective pole shoe and an inner side, which faces the pole shoe, of the respective permanent magnet. The asymmetry of the internal part can then be formed at least partially by an asymmetrical profile of the outer side of the respective pole shoe in such a manner that the respective air gap is made asymmetrical in the circumferential direction. For example, the air gap can vary in terms of its radial dimensions in the circumferential direction. An air gap that narrows or tapers in the circumferential direction is for example conceivable, it being possible for the tapering to take place in a continuous or stepped manner.

Alternatively, the asymmetry can also be realised in the pole arms and/or pole shoes by means of cut-outs and/or material variations. Material variations mean the use of different materials in some regions. For instance, a pole arm or a pole shoe can be partially replaced or penetrated by another material.

In another embodiment, at least one such pole arm can have a pole shoe on the radial outside, which has two pole shoe sections, which are arranged on both sides of the pole arm in the circumferential direction and extend in opposite directions in the circumferential direction. The asymmetry of the internal part can then be formed at least partially by an asymmetry of the pole shoe sections. For example, one pole shoe section can be larger in the circumferential direction and/or in the radial direction than the other pole shoe section.

Yet another embodiment proceeds from the fact that at least two pole arms each bear one coil. In this case the coil is formed from an electrically conductive wire. The volume between the adjacent pole arms is referred to as a winding space. The said winding space is filled with electrically conductive material. A copper filling factor inside the winding space can be influenced by means of the number of windings and/or the wire diameter, a high copper filling factor being the aim. Copper, aluminium or any other electrically conductive material can be used as the material for the coil. The asymmetry of the internal part can then be formed at least partially by an asymmetrical arrangement of the pole arms bearing the coils. For example, the pole arms bearing the coils can project radially eccentrically to the rotation axis from the internal part.

According to another advantageous embodiment, at least two coils can be provided, the asymmetry of the internal part being formed at least partially by asymmetrically formed and/or arranged coils. For example, a winding of one coil can have a greater number of turns than a winding of the other coil. Identical coils can likewise be made asymmetrical by a different arrangement. For example, one coil can be arranged radially further outwards than the other coil.

It is clear that the above-described measures, with the aid of which the asymmetry of the internal part can be realised in full or in part, can also be combined with each other virtually as desired. For example, the asymmetry of the internal part can be formed exclusively by the asymmetry of the pole shoe and the asymmetry of the coil-bearing pole arms. Alternatively, the asymmetry of the internal part can be formed exclusively by the asymmetry of the air gap and the asymmetry of the coil-bearing pole arms. Alternatively to this, the asymmetry of the internal part can be formed exclusively by the asymmetry of the air gap and the asymmetry of the pole shoes. A variant is also conceivable, in which the asymmetry of the internal part is formed exclusively by the asymmetry of the air gap and by the asymmetry of the pole shoes and by the asymmetry of the coil-bearing pole arms. It is furthermore conceivable to combine the above alternatives additionally with asymmetrically formed or arranged coils.

According to another advantageous embodiment, at least one pole arm with a pole shoe and at least one pole arm without a pole shoe can be provided. With this design of the internal part, only the pole arms that do not have a pole shoe are expediently equipped with one coil each, while the pole arms having one pole shoe are provided without a coil. It has been shown that the magnetic field generated with the aid of the coils passes via the pole arms without pole shoes into the pole arms with pole shoes in order to be able to enter into intensive interaction with the magnetic field of the permanent magnets. An embodiment in which the respective coils are placed as prefabricated components onto such a pole arm without pole shoes is then particularly advantageous. This measure considerably simplifies the assembly of the electric motor and reduces its production costs.

The electric motor preferably has a number of n pole arms and a number of n/2 coils. The coils are then assigned to every second pole arm in the circumferential direction. A number of n permanent magnets is preferably also provided, which follow each other with alternating polarity (plus and minus) in the circumferential direction.

In a preferred embodiment, exactly four pole arms can be provided, then exactly two coils being formed on two opposite pole arms. Two pole arms with pole shoes and two pole arms without pole shoes, which then bear the coils, are then expediently provided.

In another advantageous development, the two coils can be formed by separate windings or by a common winding. The use of separate windings allows the use of prefabricated coils, which can be placed onto the pole arms without pole shoes.

The external part comprises a housing, in particular a rotor housing, which encloses the internal part in the circumferential direction and which in particular has a cylindrical, preferably circular cylindrical shape. The permanent magnets of the external part are expediently arranged on an inner side of the housing, in the form of separate components. To accommodate the permanent magnets, corresponding niches can be formed on the inner side of the housing, in which the permanent magnets are arranged, preferably partially or completely countersunk, in such a manner that they form part of the inner contour of the housing. Alternatively, a design is also in principle conceivable in which the permanent magnets are integrated in the housing in such a manner that the respective permanent magnet forms part of the housing and accordingly does not define a separate component in relation to the housing. The housing, in particular a rotor housing, is formed from a magnetically conductive material. The magnetic field can thereby be directed between the permanent magnets.

Alternatively, the rotor can be formed from a magnetisable material, in particular from a magnetisable plastic. In this case, the permanent magnets are formed by magnetisable regions.

An embodiment in which exactly four permanent magnets are provided, which are arranged with alternating polarity in the circumferential direction, is particularly advantageous. Two south poles thus lie diametrically opposite each other, and offset by 90° thereto, two north poles lie diametrically opposite each other.

According to a preferred embodiment, in which the asymmetry of the stator is formed by an asymmetrical air gap, it can be provided for the asymmetrical air gap to be formed by a step in the respective outer side of the respective pole shoe. The respective pole shoe is thereby made asymmetrical in relation to a mirror plane that runs parallel to the rotation axis of the rotor and coaxially through the associated pole arm.

It can furthermore be provided for exactly two pole arms to be provided, which each have one pole shoe with a step in the outer side and lie diametrically opposite each other in relation to the rotation axis. It can optionally be provided for the said two pole arms to be formed with their stepped pole shoes point-symmetrical in relation to a rotation of 180° about the rotation axis.

According to another advantageous embodiment, it can be provided for at least one such pole arm to have at a distance from the rotation axis an end section that tapers with increasing distance from the rotation axis. Such a pole arm that tapers radially outwards thus does not bear a pole shoe, but also contributes to the electromagnetic asymmetry of the stator. In an advantageous development, the respective end section can taper asymmetrically in relation to the circumferential direction. It can in particular be provided for the respective end section to be bevelled only on one side in the circumferential direction. For example, the respective end section can narrow to a point in a wedge-shaped manner on one side.

A development is preferred in which exactly two pole arms are provided, which each have an asymmetrically tapered end section and lie diametrically opposite each other in relation to the rotation axis. The two pole arms can expediently be formed with their tapered end sections point-symmetrical in relation to a rotation of 180° about the rotation axis.

In another embodiment, it can be provided for the two above-mentioned pole arms with the asymmetrical pole shoes to be arranged offset by 90° in the circumferential direction to the two above-mentioned pole arms with the tapered end sections. An efficient electromagnetic asymmetry with a geometrically simple construction is thus produced.

According to another embodiment, it can be provided for the permanent magnets to form at least two plus poles and at least two minus poles alternately in the circumferential direction, the extent of the plus poles and of the minus poles being unequal in the circumferential direction. In particular, the plus poles can extend over a larger circumferential section in the circumferential direction than the minus poles. Alternatively, the minus poles can extend over a larger circumferential section in the circumferential direction than the plus poles.

The electric motor according to the invention can be used as a drive for general actuators such as exhaust gas return valves, EWG actuators, disc separators, centrifuges or flaps/valves in a fresh air line of an internal combustion engine.

A hydraulic pump according to the invention, which is suitable for conveying a liquid fluid, in particular a hydraulic medium, such as oil or water, is equipped with a conveying device and an electric motor of the above-mentioned type for driving the conveying device. The conveying device expediently has a stator housing, in which a conveying rotor, for example an impeller or the like, is rotatably mounted. The rotor of the electric motor is then drive-connected to the conveying rotor of the conveying device With an external rotor motor, the external rotor of the electric motor can at the same time form the conveying rotor of the conveying device. The stator of the electric motor can expediently be connected in a rotationally fixed manner to the stator housing of the conveying device.

Further important features and advantages of the invention can be found in the sub-claims, the drawings and the associated description of the figures using the drawings.

It is self-evident that the features mentioned above and those explained below can be used not only in the respectively specified combination, but also in other combinations or alone, without departing from the scope of the present invention.

Preferred exemplary embodiments of the invention are illustrated in the drawings and are described in more detail in the following description, identical reference numbers referring to identical or similar or functionally identical components.

BRIEF DESCRIPTION OF THE DRAWINGS

In the figures.

DETAILED DESCRIPTION

Figure 1:
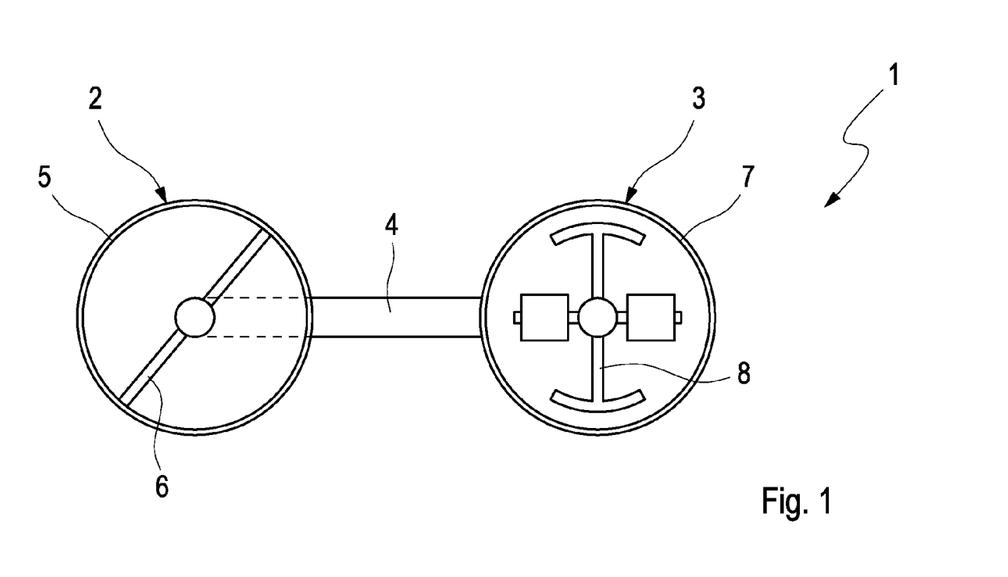
FIG. 1 schematically shows a highly simplified block-diagram-like illustration of a hydraulic pump, FIGS. 2 to 6 schematically show highly simplified cross sections of an electric motor in different embodiments, FIGS. 7 and 8 schematically show further highly simplified cross sections of electric motors of other embodiments.

According to FIG. 1, a hydraulic pump 1, with the aid of which a hydraulic medium, such as oil or water, can be conveyed, comprises a conveying device 2 and an electric motor 3. While the conveying device 2 drives the respective hydraulic medium, the electric motor 3 drives the conveying device 2. A corresponding drive connection is indicated in FIG. 1 by way of example by a drive shaft 4. The conveying device 2 has a stator housing 5, in which a conveying rotor 6 is rotatably mounted. In the example of FIG. 1, the electric motor 3 has an external rotor 7 and an internal stator 8, so that the electric motor 3 is designed as an external rotor motor in FIG. 1. The rotors 6 and 7 of the conveying device 2 and of the electric motor 3 are drive-connected to each other by means of the drive shaft 4 in the example of FIG. 1. It is likewise conceivable to couple the two rotors 6, 7 directly to each other. Further structural integration is also conceivable, for example with a common housing.

According to FIGS. 2 to 8, the electric motor 3 comprises an external part 9 and an internal part 10, which are arranged one inside the other concentrically to a rotation axis 11. Furthermore, external part 9 and internal part 10 can be rotationally adjusted relative to each about the said rotation axis 11. In the examples of FIGS. 2-8, the electric motor 3 is preferably designed as an external rotor motor, in which the external part 9 defines an external rotor, while the internal part 10 forms an internal stator. Analogously to FIG. 1, the stator is additionally labelled 8 and the rotor is additionally labelled 7 in FIGS. 2-8.

The external part 9 has at least two permanent magnets 12. In the examples of FIGS. 2-8, exactly four permanent magnets 12 are provided in each case, which are arranged distributed in the circumferential direction 13, which is indicated with a double arrow, and alternate in the circumferential direction 13 in terms of their polarity (north and south). It is clear that more or fewer than four permanent magnets 12 can also be provided in another embodiment. The external part 9 defines a cylindrical, preferably circular cylindrical housing 14, on the inner side 15 of which the permanent magnets 12 are built on in the form of separate components.

The internal part 10 has at least two pole arms 16, 17 and at least one electric coil 18. In the examples shown here, exactly four pole arms 16, 17 and exactly two coils 18 are provided in each case, which are arranged in a substantially star-shaped manner. Here too it is clear that in principle a different number of pole arms 16, 17 and a different number of coils 18 can also be realised. However, exactly twice as many pole arms 16, 17 as coils 18 are preferably present.

In a preferred use, the two coils 18 are assigned to a single phase, so that the electric motor 3 is a single-phase electric motor 3.

In principle, the two coils 18 can also be assigned to different phases, so that it is then a two-phase electric motor 3.

Two pole arms 16, which lie diametrically opposite each other, are each equipped with a pole shoe 19. The two other pole arms 17, which likewise lie substantially opposite each other, do not however have pole shoes 19. The coils 18 are preferably arranged on the pole arms 17 that do not bear any pole shoes 19.

According to FIGS. 2 to 8, the respective pole shoe 19 has an outer side 20 on the radial outside, which radially opposite an inner side 21 of a permanent magnet 12. An air gap 22 can be formed radially between the outer side 20 of the respective pole shoe 19 and an inner side 21, which faces the said pole shoe 19, of the respective permanent magnet 12.

In each of the embodiments of the electric motor 3 shown here, the external part 9 is symmetrical in the circumferential direction 13, while the internal part 10 is asymmetrical in the circumferential direction 13. The startup behaviour of the electric motor 3 can be considerably improved by the asymmetry of the internal part 10. Furthermore, the relative position between external part 9 and internal part 10 can always be determined by the asymmetry of the internal part 10 in conjunction with a corresponding electronic system.

When the electric motor 3 is not supplied with current and therefore no electric voltage is present at the coils 18, the internal part 10 and external part 9 assume the starting relative position shown in FIGS. 2-8 relative to each other. In this starting relative position, the magnetic forces prevailing between the internal part 10 and external part 9 are in equilibrium. The asymmetry of the internal part 10 is then selected such that when the electric motor 3 is supplied with current to start the electric motor 3, a magnetic field is formed, which drives the rotor, that is, in this case the external rotor 7 and the external part 9, in a predefined rotation direction. Such an asymmetry of the internal part 10, which exhibits the above-described effect when the electric motor 3 starts up, can be realised in different ways, which are explained in more detail below using FIGS. 2-8. In FIGS. 2 to 8, different measures for realising the desired asymmetry of the internal part 10 are realised largely alternatively in each of the variants of FIGS. 2 to 8. It is clear that the individual measures can also be realised cumulatively and in any desired combination.

Figure 2:
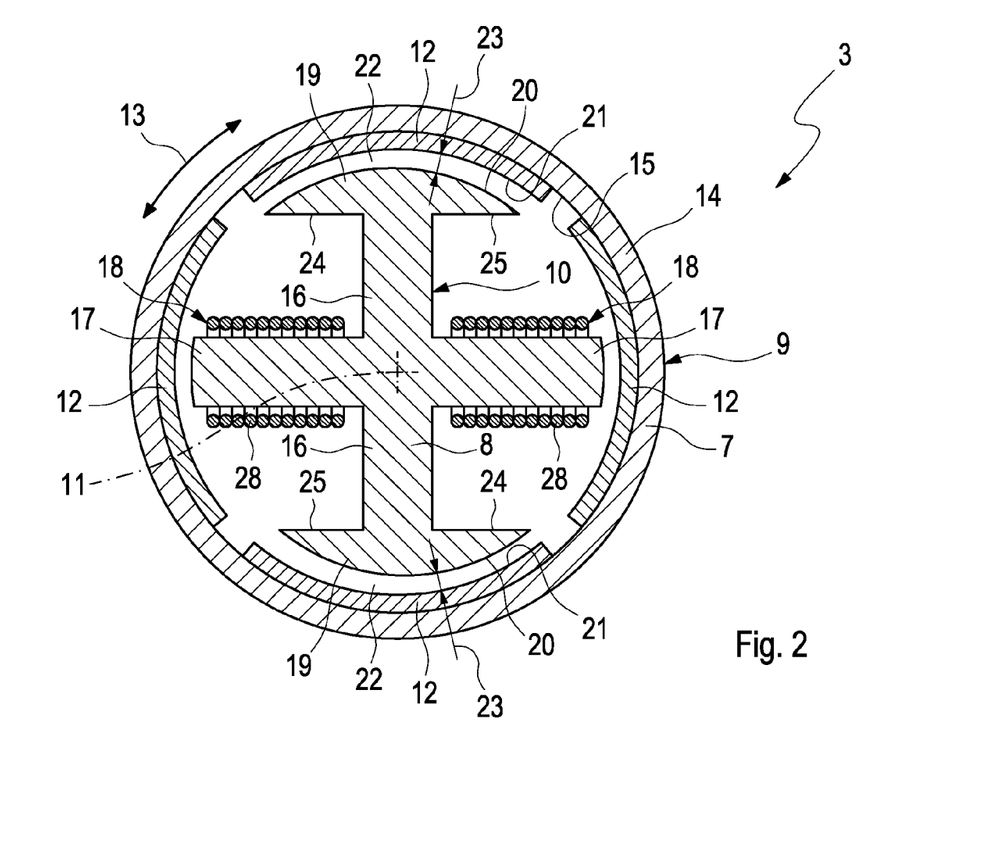

In the embodiment shown in FIG. 2, the asymmetry of the internal part 20 is formed by an asymmetrical profile of the outer side 20 of the respective pole shoe 19. The asymmetry of the outer side 20 is formed such that the respective air gap 22 is asymmetrical in the circumferential direction 13. In the example of FIG. 2, a radial dimension of the air gap 22 increases in the circumferential direction, namely in the clockwise direction. In other words, a gap width 23 increases in the clockwise direction. The change in the air gap 22 takes place continuously or constantly in the example. In another embodiment, the outer side 20 of the respective pole shoe 19 can also be stepped or realised by means of an asymmetrically arranged longitudinal groove.

The respective pole shoe 19 has two pole shoe sections 24, 25, which project from the respective pole arm 16 in opposite directions in the circumferential direction 13. One pole shoe section 24 thus extends anticlockwise, while the other pole shoe section 25 extends clockwise. The two pole shoe sections 24, 25 are thus arranged on both sides of the respective pole arm 16 in relation to the circumferential direction 13.

Figure 3:
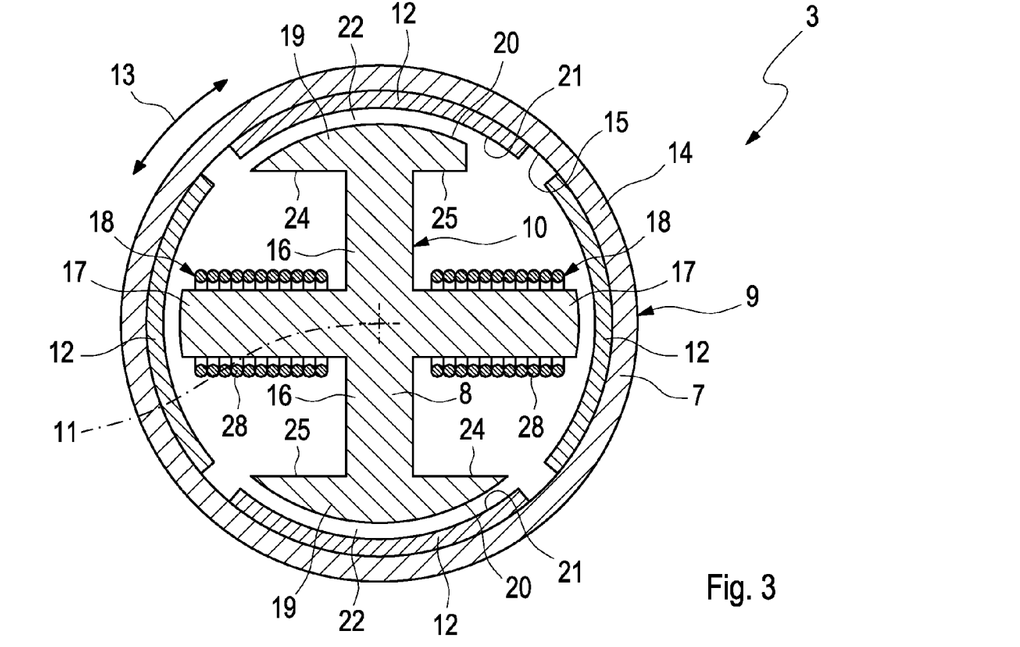
Figure 4:
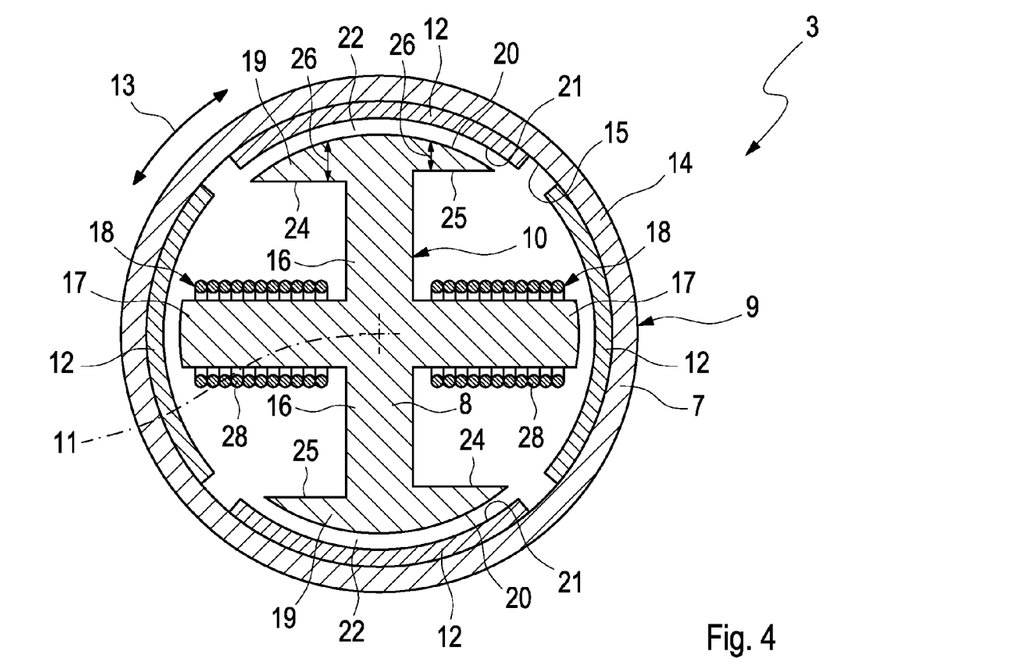
Figure 5:
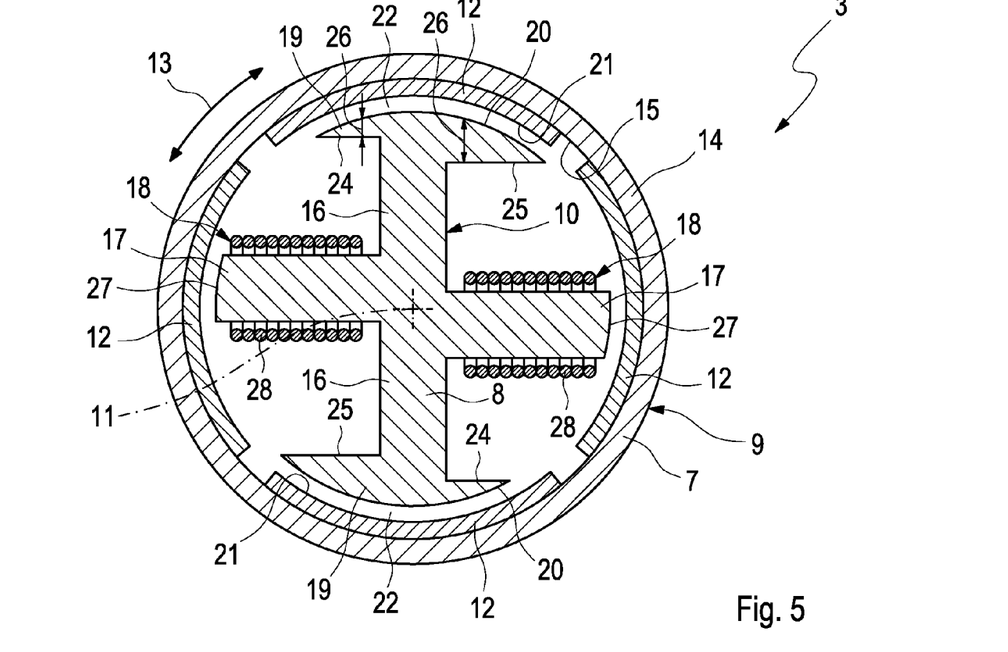

According to FIGS. 3-5, the asymmetry of the inner part 10 can then be formed by an asymmetry of the pole shoe sections 24, 25. In the embodiment shown in FIG. 3, the left-hand pole shoe section 24 in the circumferential direction 13 is larger than the right-hand pole shoe section 25 in the upper pole shoe 19. In contrast thereto, in the example of FIG. 3, the lower pole shoe 19 is constructed symmetrically in terms of its pole shoe sections 24, 25. It is clear that in principle both pole shoes 19 can be made asymmetrical.

In the embodiments of FIGS. 4 and 5, the two pole shoe sections 24, 25 are formed differently in terms of their radial extent in the respective pole shoe 19. So in FIG. 4, the left-hand pole shoe section 24 is given a greater depth 26 in the radial direction than the right-hand pole shoe section 25 in the upper pole shoe 19. In the embodiment of FIG. 5, however, the radial depth 26 is smaller in the left-hand shoe section 24 than in the right-hand shoe section 25 in the upper pole shoe 19. Furthermore, it is additionally provided in the variants of FIGS. 4 and 5 for the pole shoe sections 24, 25 to differ from each other also in terms of their extent in the circumferential direction 13. So in FIG. 4, the left-hand pole shoe section 24 is larger or longer in the circumferential direction 13 than the right-hand pole shoe section 25 in the upper pole shoe 19. Conversely, in the variant of FIG. 5, the left-hand pole shoe section 24 is smaller or shorter in the circumferential direction 13 than the right-hand pole shoe section 25 in the upper pole shoe 19.

In the embodiment shown in FIG. 5, the asymmetry of the internal part 10 is also defined by the fact that the pole arms 17 provided with the coils 18 are arranged asymmetrically. So in the starting position shown in FIG. 5, the left-hand pole arm 17 that bears the coil 18 is arranged offset eccentrically upwards in relation to the rotation axis 11, while the right-hand pole arm 17 that bears the coil 18 is correspondingly arranged offset eccentrically downwards to the rotation axis 11. In order to keep the distances to the associated adjacent pole shoe sections 24, 25 equal, in this embodiment the radial dimensions 26 of the pole shoe sections 24, 25 are selected accordingly, in order to equalise the eccentric offset of the pole arms 17 provided with the coils 18. Thus the respective pole arm 17 bearing a coil 18 in the variant of FIG. 5 is in each case positioned centrally between the associated pole shoe sections 24, 25 of the two pole shoes 19. Owing to the eccentric arrangement of the pole arms 17 provided with the coils 18, the radially external outer sides 27 of the said pole arms 17 are also asymmetric.

Figure 6:
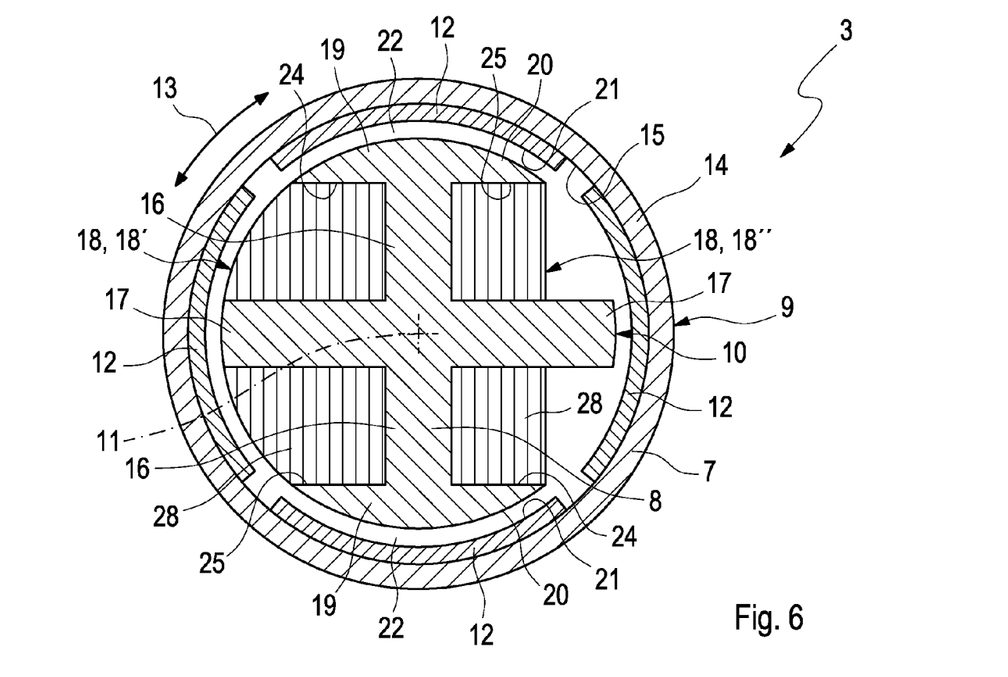

In the embodiment shown in FIG. 6, the asymmetry of the internal part 10 is also produced by the fact that the two coils 18 are formed differently or asymmetrically. So in FIG. 6, the left-hand coil 18 or 18' has greater dimensions than the right-hand coil 18 or 18".

The coils 18 can be realised with the aid of separate windings 28 as in the embodiments shown here. The use of separate windings 28 makes it possible to prefabricate the coils 18 as separate components, which can be placed onto the respective pole arm 17 without pole shoes before the internal part 10 is inserted into the external part 9. This makes assembly simpler.

Alternatively, an embodiment is also conceivable in principle in which the two coils 18 are realised with the aid of an identical winding, which is then attached directly to the internal part 10. In this case the coils 18 are of equal size. A higher copper filling factor is realised in the coil 18 shown on the left-hand side of the image than in the coil 18 shown on the right-hand side of the image. This is realised in that the whole winding space is filled with the coil wire.

Figure 7:
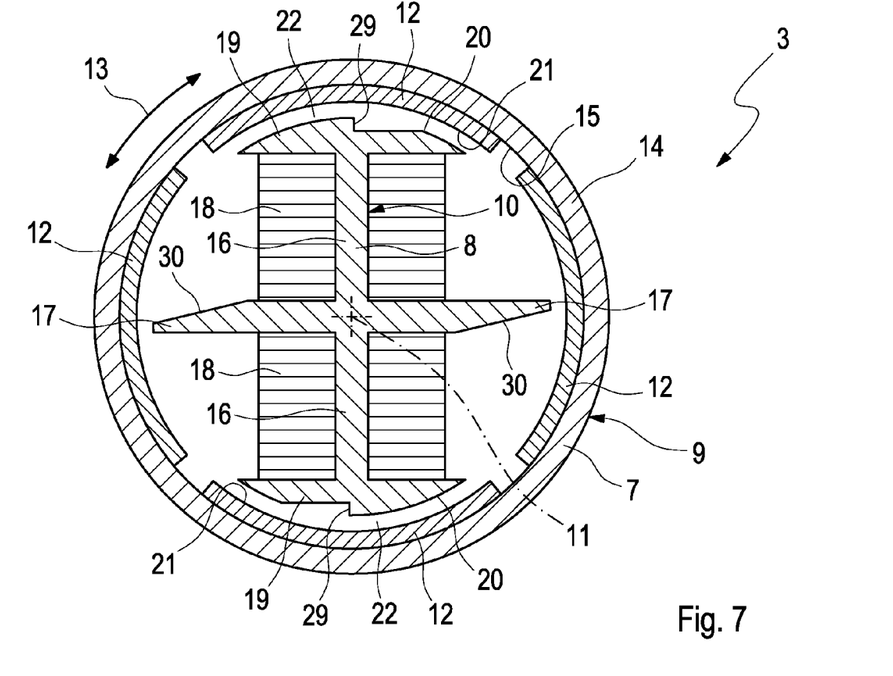
Figure 8:
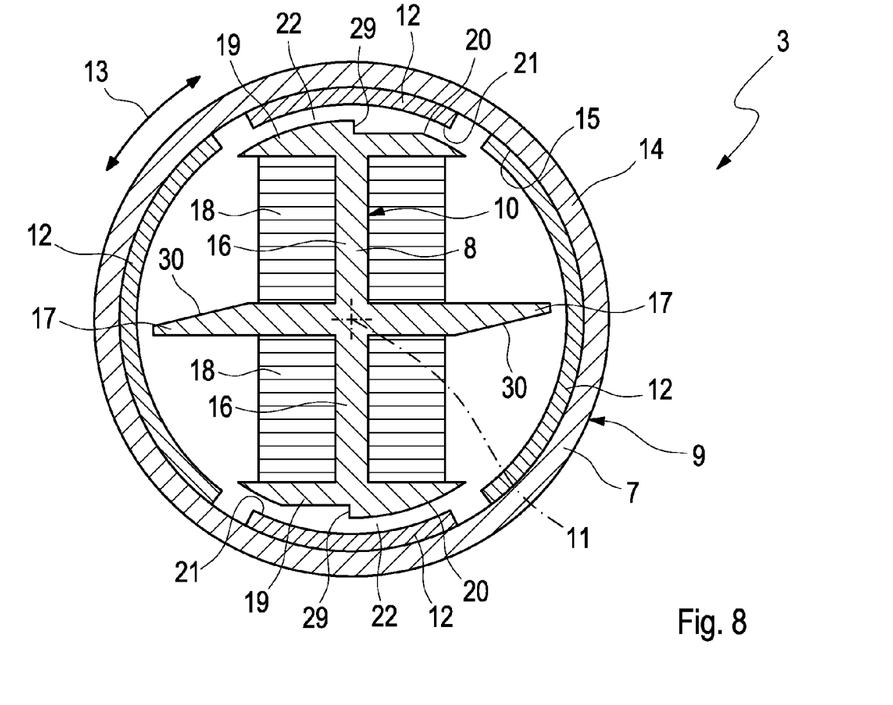

In the embodiments of FIGS. 7 and 8, the asymmetry of the stator 8 is again formed by an asymmetrical air gap 22. To this end, it is provided for the asymmetrical air gap 22 to be formed by a step 29 in the respective outer side 20 of the respective pole shoe 19. The respective pole shoe 19 is thereby made asymmetrical in relation to a mirror plane that runs parallel to the rotation axis 11 of the rotor 9 and coaxially through the associated pole arm 16. The said mirror plane stands perpendicularly to the drawing plane.

It is furthermore provided here for exactly two pole arms 16 to be provided, which each have one pole shoe 19 with a step 29 in the outer side 20 and lie diametrically opposite each other in relation to the rotation axis 11. In this case the said two pole arms 16 are formed with their stepped pole shoes 19 point-symmetrical in relation to a rotation of 180° about the rotation axis 11.

Moreover, it is provided here for at least one of the other pole arms 17 to have at a distance from the rotation axis 11 an end section 30 that tapers with increasing distance from the rotation axis 11. Such a pole arm 17 that tapers radially outwards thus does not bear a pole shoe 19, but also contributes to the electromagnetic asymmetry of the stator 8. In the advantageous developments shown here, the respective end section 30 can taper asymmetrically in relation to the circumferential direction 13. It is in particular provided here for the respective end section 30 to be bevelled only on one side in the circumferential direction 13. For example, the respective end section 30 narrows to a point in a wedge-shaped manner on one side.

The development shown here in FIGS. 7 and 8 is preferred, in which exactly two such pole arms 17 are provided, which each have an asymmetrically tapered end section 30 and lie diametrically opposite each other in relation to the rotation axis 30. The two pole arms 17 are in this case also formed with their tapered end sections 30 point-symmetrical in relation to a rotation of 180° about the rotation axis 11.

In the preferred embodiments shown here, it is provided for the two above-mentioned pole arms 16 with the asymmetrical pole shoes 19 to be arranged offset by 90° in the circumferential direction 13 to the two above-mentioned pole arms 17 with the tapered end sections 30.

According to the embodiment shown in FIG. 8, it can be provided for the permanent magnets 12 to form at least two plus poles and at least two minus poles alternately in the circumferential direction 13, the extent of the plus poles and of the minus poles being unequal in the circumferential direction. In particular, the plus poles can extend over a larger circumferential section in the circumferential direction than the minus poles. Alternatively, the minus poles can extend over a larger circumferential section in the circumferential direction than the plus poles. In FIG. 8, a total of four magnets 12 are provided, the two magnets 12 that lie opposite each other in the vertical, that is, at the top and bottom, being smaller in the circumferential direction 13 than the two other magnets 12 that lie opposite each other in the horizontal, that is, left and right. This arrangement of the magnets 12 is however symmetrical in relation to a vertical mirror plane that contains the rotation axis 11.

The invention claimed is:

1. An electric motor, comprising:
a symmetric rotor and an asymmetric stator;
an external part and an internal part arranged concentrically to a rotation axis and adjustable rotationally relative to each other about the rotation axis;
wherein the external part defines one of the rotor and the stator, and the internal part defines the other of the rotor and the stator;
the external part including at least two permanent magnets;
the internal part including at least two pole arms and at least one electric coil, the at least two pole arms including a first pole arm having a pole shoe and a second pole arm without a pole shoe, wherein the at least one coil is arranged on the second pole arm without the pole shoe; and
wherein an asymmetry of the stator is provided by an asymmetry of the second pole arm without the pole shoe that bears the at least one coil.

2. The electric motor according to claim 1, wherein the asymmetry of the stator is selected such that, when the electric motor is supplied with current in order to start the electric motor in a starting relative position that is automatically produced between the stator and the rotor when the electric motor is not supplied with current, a magnetic field is produced, which drives the electric motor in a predefined rotation direction.

3. The electric motor according to claim 1, wherein the pole shoe is disposed on a radial outside of the first pole arm relative to the rotation axis and extends from the first pole arm in a circumferential direction of the rotation axis, the pole shoe having a radially outer side;
an air gap is disposed radially between the outer side of the pole shoe and an inner side of a respective one of the at least two magnets that faces the pole shoe; and
the asymmetry of the stator is further provided by an asymmetrical profile of the outer side of the pole shoe in such a manner that the air gap is asymmetrical in the circumferential direction.

4. The electric motor according to claim 3, wherein the asymmetrical profile of the outer side of the pole shoe varies a radial dimension of the air gap along the circumferential direction.

5. The electric motor according to claim 1, wherein the pole shoe is disposed on a radial outside of the first pole arm relative to the rotation axis, the pole shoe having two pole shoe sections arranged on circumferentially opposite sides of the first pole arm extending away from each other in a circumferential direction; and
the asymmetry of the stator is further provided by an asymmetry of the two pole shoe sections.

6. The electric motor according to claim 5, wherein one pole shoe section is larger than the other pole shoe section.

7. The electric motor according to claim 1, wherein the asymmetry of the stator provided by the asymmetry of the second pole arm includes an asymmetrical arrangement of the second pole arm bearing the at least one coil, the asymmetrical arrangement defined by the second pole arm arranged offset eccentrically to the rotation axis.

8. The electric motor according to claim 1, wherein the at least two pole arms include a third pole arm bearing another electric coil; and
wherein the asymmetry of the stator is further provided by at least one of asymmetrically formed coils and asymmetrically arranged coils.

9. The electric motor according to claim 1, wherein the at least one coil is a prefabricated component placed onto the second pole arm without the pole shoe.

10. The electric motor according to claim 1, wherein the at least two pole arms include four pole arms; and
the at least one coil includes two coils respectively disposed on opposite pole arms.

11. The electric motor according to claim 10, wherein at least one of:
the two coils are formed by one of separate windings and a common winding, and
the at least two permanent magnets includes four permanent magnets arranged distributed along the external part with alternating polarity in a circumferential direction.

12. The electric motor according to claim 1, wherein a number of pole arms is twice as high as a number of coils and equal to a number of permanent magnets alternating in polarity along a circumferential direction, the coils being assigned to every other pole arm in the circumferential direction.

13. The electric motor according to claim 3, wherein the pole shoe of the first pole arm includes a radial step in the respective outer side to vary a radial dimension of the air gap along the circumferential direction, the radial step defining the asymmetrical profile of the outer side of the pole shoe.

14. The electric motor according to claim 13, wherein the at least two pole arms further include a third pole arm, the third pole arm having a pole shoe defining an outer side provided with another step, and wherein the step of the first pole arm and the step of the third pole arm lie diametrically opposite each other in relation to the rotation axis.

15. The electric motor according to claim 1, wherein the first pole arm having the pole shoe is without an electric coil.

16. The electric motor according to claim 1, wherein the second pole arm has an end section at a distance radially from the rotation axis, and wherein the end section tapers radially outwards with increasing distance from the rotation axis.

17. The electric motor according to claim 1, wherein the at least two permanent magnets form at least two plus poles and at least two minus poles alternately in a circumferential direction, an extent of the plus poles and of the minus poles being unequal in the circumferential direction.

18. The electric motor according to claim 17, wherein:
the plus poles extend over a larger circumferential section in the circumferential direction than the minus poles, and
the minus poles extend over a larger circumferential section in the circumferential direction than the plus poles.

19. A hydraulic pump for conveying a hydraulic medium, comprising:
a conveying device;
an electric motor for driving the conveying device, the electric motor including:
a rotor and a stator;
an external part and an internal part arranged concentrically to a rotation axis of the electric motor and adjustable rotationally relative to each other about the rotation axis;
wherein the electric motor is one of (i) an external rotor motor where the external part is the rotor and the internal part is the stator, and (ii) an internal rotor motor where the external part is the stator and the internal part is the rotor;
the external part including at least two permanent magnets;
the internal part including at least two pole arms and at least one electric coil, the at least two pole arms including at least one pole arm having an end section disposed at a distance from the rotation axis that tapers with increasing distance from the rotation axis, wherein the end section tapers asymmetrically in relation to a circumferential direction of the rotation axis; and
wherein the rotor is formed symmetrically and the stator is formed asymmetrically.

20. The electric motor according to claim 1, wherein the asymmetry of the stator is provided via an asymmetric distribution of electromagnetic forces in a circumferential direction effective for driving the rotor.

21. The electric motor according to claim 1, wherein the external part defines the rotor and the internal part defines the stator.

22. An electric motor, comprising:
a rotor and a stator;
an external part and an internal part arranged concentrically to a rotation axis and adjustable rotationally relative to each other about the rotation axis;
the external part including at least two permanent magnets;
the internal part including at least two pole arms and at least one electric coil;
wherein the external part defines one of the rotor and the stator, and the internal part defines the other of the rotor and the stator, and wherein the rotor is symmetrical and the stator is asymmetrical; and
wherein at least one pole arm of the at least two pole arms has an end section at a distance from the rotation axis that tapers with increasing distance from the rotation axis, the end section tapering asymmetrically in relation to a circumferential direction.

23. The electric motor according to claim 22, wherein the end section of the at least one pole arm is beveled on one side in the circumferential direction.

24. The electric motor according to claim 22, wherein the at least two pole arms are disposed diametrically opposite each other in relation to the rotation axis, and the at least two pole arms each have the end section tapering asymmetrically in relation to the circumferential direction.

25. The electric motor according to claim 24, wherein at least two pole arms are arranged with the end section disposed point-symmetrical in relation to a rotation of 180° about the rotation axis.

26. The electric motor according to claim 24, wherein the internal part further includes at least two other pole arms respectively having a pole shoe, the at least two other pole arms arranged offset by 90° in the circumferential direction to the at least two pole arms having the end section tapering in the circumferential direction.

* * * * *